United States Patent [19]
Minami

[11] 3,874,255
[45] Apr. 1, 1975

[54] HYDRAULIC SPEED CHANGE CONTROL DEVICE

[75] Inventor: Teruo Minami, Hiratsuka, Japan

[73] Assignee: Kabushiki Kaisha Komatsu Seisakusho, Tokyo, Japan

[22] Filed: Jan. 15, 1973

[21] Appl. No.: 323,444

[72] Continuation-in-part of Serial No. 158,491, filed June 30, 1971.

[30] Foreign Application Priority Data
June 30, 1970 Japan.................................. 45-56685
June 30, 1970 Japan.................................. 45-56686

[52] U.S. Cl.......... 74/866, 317/148.5 R, 137/625.64
[51] Int. Cl....................................................... B60k
[58] Field of Search........ 74/866, 753; 317/148.5 R; 137/625.64

[56] References Cited
UNITED STATES PATENTS

| | | | |
|---|---|---|---|
| 3,129,645 | 4/1964 | Olmsted.......................... | 137/625.64 |
| 3,188,047 | 6/1965 | Criffield.......................... | 137/625.64 |
| 3,448,640 | 6/1969 | Nelson................................... | 74/866 |
| 3,491,254 | 1/1970 | Van Ness...................... | 317/148.5 R |
| 3,710,630 | 1/1973 | Sumiyoshi et al...................... | 74/866 |
| 3,766,432 | 10/1973 | Markowitz.................... | 317/148.5 R |

Primary Examiner—Wesley S. Ratliff, Jr.
Attorney, Agent, or Firm—Armstrong, Nikaido & Wegner

[57] ABSTRACT

A hydraulic speed change control device for use in transmission gears of crawler tractors of the kind comprising control means for gradually increasing the pressure of hydraulic fluid to be fed to a fluid torque convertor and control means of a speed change mechanism for controlling the amount of return of hydraulic fluid to activate clutches of a planetary speed change mechanism, characterized in that said control means of the speed change mechanism includes a plurality of spools and solenoid valves associated therewith, each of said solenoid valves being adapted to cause a pressure differential between both end faces of each of said spools, said pressure differential acting on each of said spools to move the latter.

10 Claims, 6 Drawing Figures

HYDRAULIC SPEED CHANGE CONTROL DEVICE

This is a continuation-in-part of Ser. No. 158,491, filed June 30, 1971.

This invention relates to a hydraulic speed change control device for use in crawler tractors such as bulldozers and which is of the type having a transmission gear to which hydraulic pressure is applied for speed change, and more particularly to a hydraulic speed change control device of the type comprising a control means for gradually increasing the pressure of hydraulic fluid to be fed to a fluid torque convertor and a control means for regulation of the speed change mechanism for controlling the amount of return of hydraulic fluid to activate the clutches of the planetary speed change mechanism.

It is an object of the present invention to improve the durability of the power transmission system of vehicles and enable speed change to be effected smoothly by gradually increasing the hydraulic pressure exerted on the power transmission system, and provide a small-sized control means with a simple construction.

It is another object of the present invention to provide a remotely operable control means.

It is still a further object of the present invention to provide a control means for improving the comfortableness of the operator of the vehicle by controlling the amount of return of the hydraulic fluid actuating clutches of planetary type speed change mechanism in order to reduce the shock which frequently occurs at the time of speed change.

Still further objects and advantages of the present invention and the manner in which it is carried into practice are made apparent in the following specification wherein the invention is described in detail by reference to the accompanying drawings.

SUMMARY OF THE INVENTION

This invention relates to a hydraulic speed change control device for use in the transmission gears of crawler tractors and which is of the kind comprising a control means for gradually increasing the pressure of hydraulic fluid to be fed to the fluid torque convertor and a control means for regulating the speed change mechanism for controlling the amount of return of hydraulic fluid to activate clutches of a planetary speed change mechanism, characterized in that said control means of the speed change mechanism includes a plurality of spools and solenoid valves associated therewith, each of said solenoid valves being adapted to cause a pressure differential between both end faces of each said spools, said pressure differential acting on each of said spools to move the latter.

BRIEF EXPLANATION OF THE DRAWINGS

The accompanying drawings show an embodiment of the present invention;

FIG. 4 shows a chart illustrating a clutch connection.

DETAILED EXPLANATION OF THE INVENTION

The invention will now be described below by way of an example with reference to the drawings.

1. Transmission Gear Train

Figure 5:
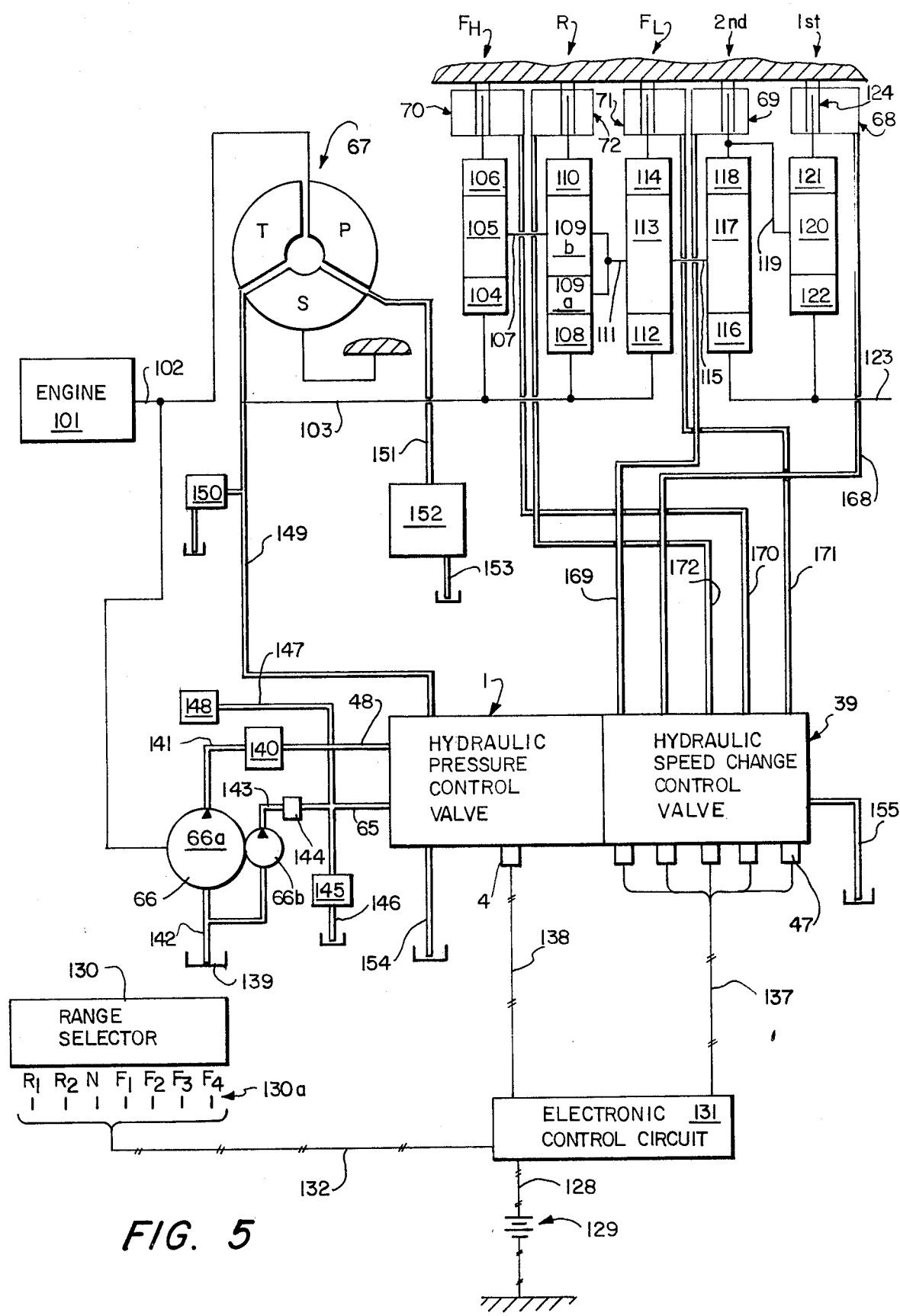
FIG. 5 is a schematic overall view of the transmission.

As shown in FIG. 5, the input shaft 102 of the transmission is driven by the engine 101 so as to drive a hydraulic torque convertor 67.

The torque convertor is composed of a hydraulic torque convertor pump P, a turbine T, and a stator S known as matters of common knowledge. The planetary gear set driven by a torque convertor output shaft 103 and controlled by the device of the present invention is composed of two groups such as sun gears 104, 108, 112, 116 and 122, and planet gears 106, 110, 114, 118, 121, and carriers 107, 111, 115 and 119 known as matters of common knowledge.

Figure 1:
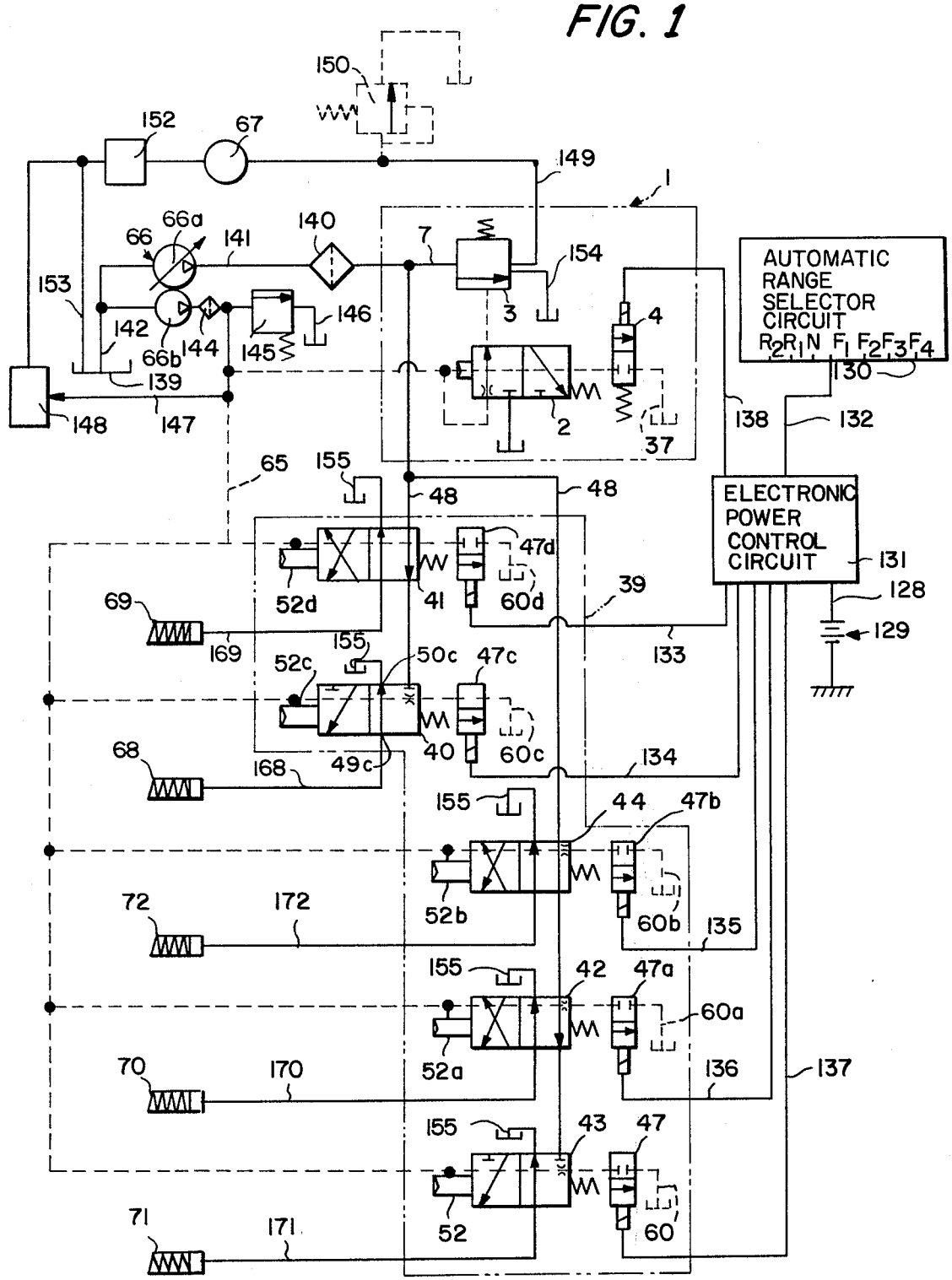
FIG. 1 is a schematic circuit diagram of control means for gradually increasing hydraulic pressure and a hydraulic speed change control means embodying the present invention.

The respective clutches 68, 69, 70, 71 and 72 of a simple planetary set of first speed gear ratio and second speed gear ratio of speed selecting group by the carrier input and sun gear output of the first group, a simple planetary set of Forward gear-high ratio $F_H$ and Forward gear-low ratio $F_L$ of direction selecting group by the sun gear input and the carrier output of the second group, and Reverse gear ration R of double planetary pinion set represented by 109a and 109b containing a reverse output power with respect to the input are engaged with the ring gears of the respective gear sets, and the fluid motor is operated by the control means shown in FIG. 1 by the combination of the respective one clutches of the respective groups shown in FIG. 4, and the respective ring gears are grounded by a brake 124 so as to obtain four forward and two reverse gear ratios at the output shaft 123.

The transmission control means is divided into an electronic circuit and a hydraulic circuit, which will now be described hereinafter.

2. Electronic Control Circuit

Figure 6:
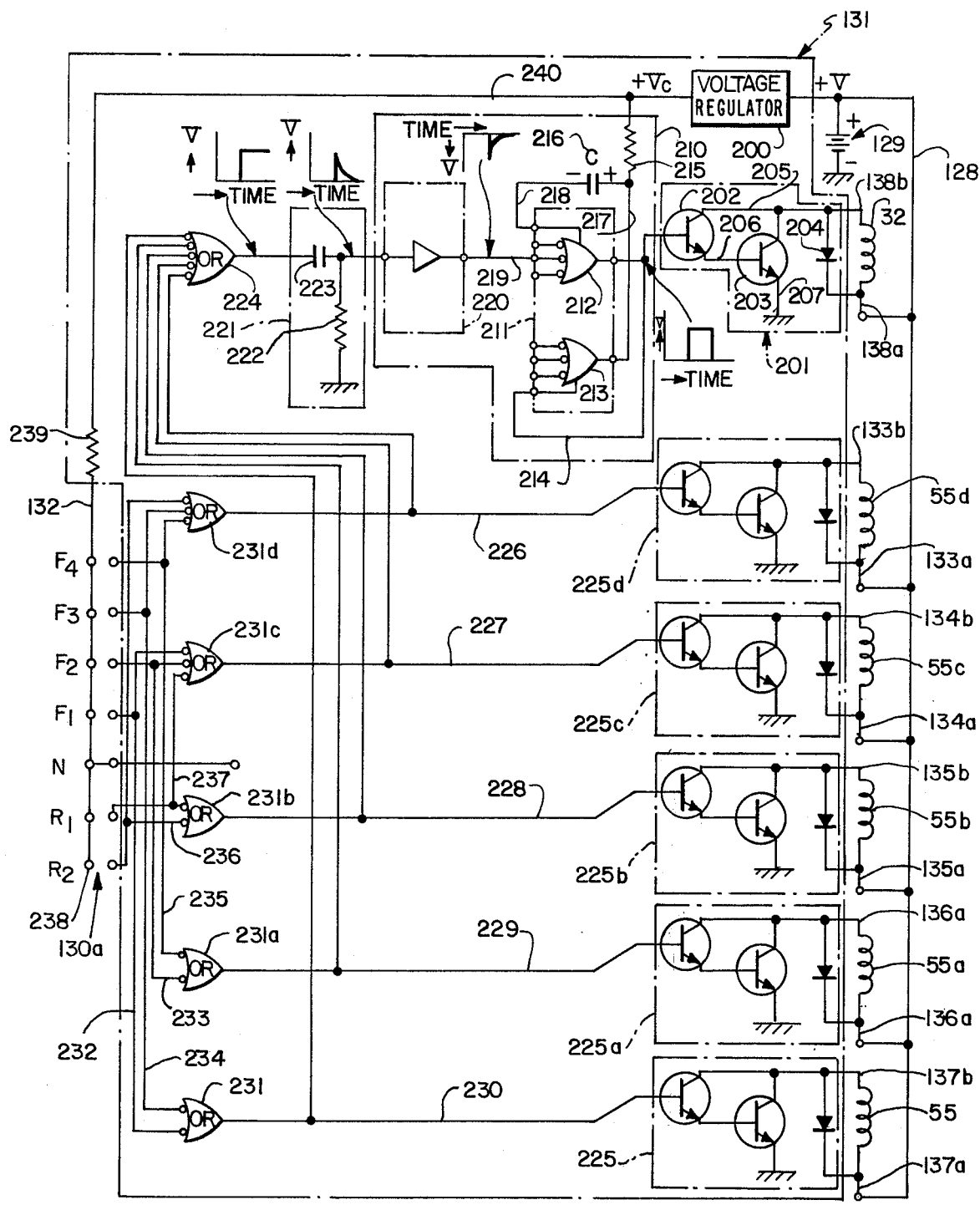
FIG. 6 is a wiring diagram of an electronic control circuit.

As shown in FIG. 6, the electronic control circuit is functionally divided largely into an automatic range selector circuit 130 and a power control circuit 131.

Since the scope of the present invention resides in the hydraulic speed change control device of the transmission, the automatic range selector circuit 130 will not be described in detail, but is represented by 130a as an equivalent switch.

Electronic power is supplied from a battery 129 carried on a vehicle through a line 128 to the electronic power control circuit 131. The battery 129 is connected to an engine 101, and is always charged as long as a generator is rotated by the rotating engine 101.

The line 128 is connected to the lines 133a, 134a, 135a, 136a, 137a and 138a is connected to the solenoids 32, 55, 55a, 55b, 55c and 55d of the respective solenoid valves.

The respective constituents of the connection of the respective solenoids to the respective switching power transistors 201, 225, 225a, 225b, 225c, and 225d by the return lines 133b, 134b, 135b, 136b, 137b and 138b are the same in content, and accordingly the connection of the solenoid 32 to the switching power transistor 201 will now be described for driving the solenoid 32.

The collectors of the transistors 202 and 203 are connected by the line 205 connected to the line 138b to the solenoid. The emitter of the transistor 202 is connected to the base of the transistor 203 by the line 206, and the emitter of the transistor 203 is grounded, and a control current is connected to the input of the base of the transistor 202 in a Darlington connection which has a large direct current mu-factor so as to conduct the switching operation by extremely small input current. A diode 204 inserted in parallel with the solenoid is for the protection of the transistors 202 and 203.

On the other hand, the line 128 from the battery 129 is connected to the electronic power control circuit 131, and passes a voltage regulator 200 wherein the voltage applied to the line is made to a constant voltage, and is supplied to the line 240.

The voltage of the line 240 is supplied through a resistor 239 to the automatic range selector circuit 130 by a line 132, and is connected to the respective terminals 238 represented by R1, R2, N, F1, F2, F3 and F4 shown in the switch 130a equivalent to the circuit 130 shown in the drawing.

When the equivalent switch 130a is moved from the terminal N to the terminal F1, OR-circuit 231 and 231c are operated so as to energize the lines 230 and 227, and to energize the bases of the switching transistors 225 and 225c, to operate the solenoids 55 and 55c and to operate the automatic speed change control valve as will be hereinafter described.

The electric current which flows through the lines 227 and 230 operates the OR-circuit 224 so that the electric current of the same waveform of voltage as that of the lines 227 and 230 flows to the differential circuit 221 of the next stage so as to convert it to the trigger pulse for the monostable multivibrator 210. (In the drawings, it is represented by the CR differentiating circuit connected by a condenser 223 and a resistor 222 for better understanding thereof, but may be operated by another circuit within the scope of the present invention.) Since the monostable multivibrator 210 is composed of one IC unit 211 integrated with NAND-circuits 212 and 213, the trigger pulse of reverse voltage waveform generated by the differential circuit 221 is connected through a wave converter 220 composed of NAND-circuits by line 219 to the input of the NAND-circuits 212. The output of the NAND-circuit 212 is connected directly to the expander terminal 214 of the NAND-circuit 213. The output of the NAND-circuit 213 is connected in alternating current through a condenser C 216 to the expander terminal 218 of the NAND-circuit 212. The terminal 217 is connected through a resistor R 215 to a constant voltage line 240.

If the range selector switch 130a is in a normal state (such as in the state of N or F1 kept as it is) so that the NAND-circuit 213 is off and the NAND-circuit 212 is on and the NAND-circuit 220 is also off, when the positive pulse generated by the differentiating circuit 221 by the signal from the lines 227 and 230 as aforementioned is fed to the input terminal of the NAND-circuit 220, the negative input pulse is fed to the NAND-circuit 212 so that the collector of the NAND-circuit 213 is forcibly drawn to low potential through the base of the NAND-circuit 212 and the condenser C 216. Therefore, the NAND-circuit 212 is inverted from on to off, while the NAND-circuit 213 is inverted from off to on. At this time, the condenser C 216 is charged in the polarity as shown in the drawings. If the voltage of the condenser C 216 which is the voltage that the charges of the condenser C 216 start to discharge through the base resistor of the inverter when the input pulse is stopped is raised to the voltage for starting to conduct the base of the NAND-circuit 212, the NAND-circuit 212 becomes energized again, while the NAND-circuit 213 becomes de-energized inversely to return to the original normal state. Accordingly, the switching power transistor 210 is operated by the output of the pulse width corresponding to the time from when the input is fed thereinto so that they are inverted to on and off to when they return to the original normal state, and the solenoid 32 is driven in short time so as to positively provide the modulation hydraulic pressure as will be hereinafter described.

The short time for energizing the solenoid 32 is set to an optimum value by changing the time constant condenser 216 and the resistor 215.

If the equivalent switch 130a is shifted from F1 to F2, an electric current will flow through the line 233 so as to operate OR-circuits 231a and 231c, even if an electric current flows through the lines 229 and 227, the OR-circuit 224 is operated as was described heretofore. If the equivalent switch 130a is then shifted from F2 to F3, an electric current will flow through the line 234 so as to operate the OR-circuits 231 and 231d. If the switch 130a is shifted from F3 to F4, an electric current flows through the line 235 so as to operate the OR-circuits 231a and 231d. If the switch 130a is shifted from N to R1, , an electric current flows through the line 237 so as to operate the OR-circuits 231b and 231c. When the switch 130a is shifted from R1 to R2, and electric current flows through the line 236 so as to operate the OR-circuits 231b and 231d to operate the OR-circuit 224. Similarly, in case of power shift, at the time when the equivalent switch 130a is shifted, two OR-circuits 231 to 231d and the OR-circuits 224 are always operated to operate the monostable multivibrator 210 and to lower the fluid pressurized by the pump 66a at speed change by the modulation relief valve 3 in order to drive the solenoid for minimum time required for operating the timing pressure valve 2 for positively providing modulation hydraulic pressure of the lines 169 to 172 important for the purpose of preventing the shock at the clutch engaging.

3. Hydraulic Control Circuit

The oil pressure pump 66 is connected to the engine 101 by a gear device (not shown) so as to supply the pressurized fluid from a sump 139 through a passage 142 to a control device.

As the pump 66 supplies the fluid to the control device 148 out of the present invention, it is composed of a dual pump represented by 66a and 66b in the embodiment of the present invention.

The fluid pressurized by the pump 66a is supplied through a passage 141 and filter 140 to the inlet port 7 of the hydraulic pressure control valve 1 and the inlet port 48 of the automatic speed change control valve 39.

On the other hand, the fluid pressurized by the pump 66b is supplied through a passage 143, filter 144, and passage 147 to another control device 148.

The fluid of the passage 147 is regulated to a constant pressure by a pressure control relief valve 145 so that the relieved fluid is returned to the sump 139 by a drain line 146.

A branch conduit 65 is communicated with the passage 147 to be communicated with the port 26 of the pressure control valve 1 and the pressure chamber 52 of the speed change control valve 39.

Referring now to FIG. 1, a control means 1 for gradually increasing hydraulic pressure comprises a timing pressure valve 2, a modulation relief valve 3 and a solenoid valve 4.

Figure 2:
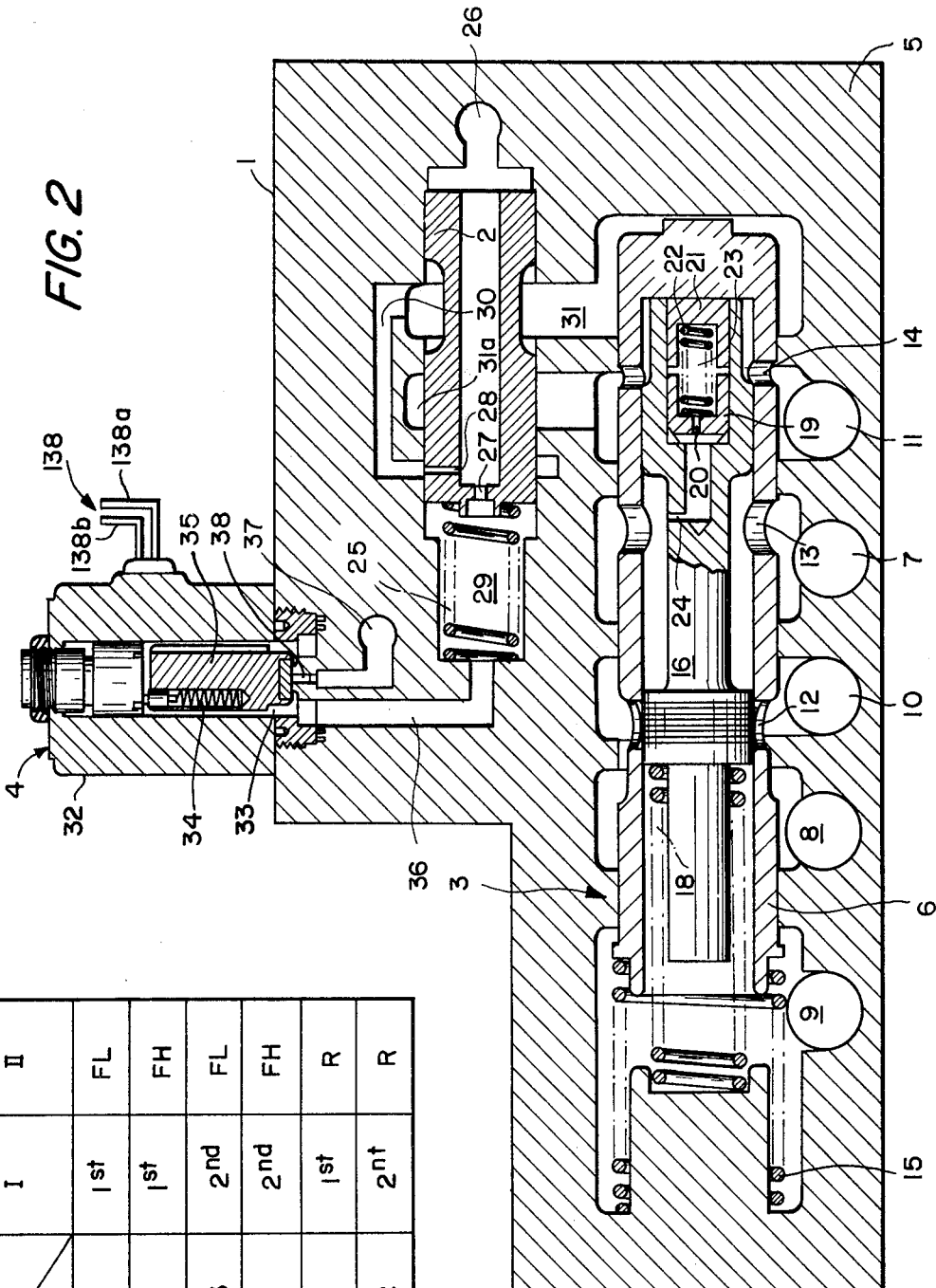
FIG. 2 is a sectional view of the control means for gradually increasing hydraulic pressure.

As can be seen from FIG. 2, a cylindrical valve 6 for modulation relief is slidably disposed within a valve body 5, and the internal peripheral wall of the portion within which the cylindrical valve 6 is disposed is formed with an inlet port 7 through which hydraulic fluid flows, a torque convertor port 8 and drain ports 9, 10, 11.

The fluid fed out of the torque convertor port 8 is supplied through a passage 149 to the torque convertor 67. A relief valve 150 is inserted into the conduit 149 so as to control the maximum pressure fed to the torque convertor. The fluid fed out of the torque convertor 67 is returned through a passage 151 and a heat exchange 152 to a sump 139 by a conduit 153.

The fluid fed out of the drain ports 9, 10 and 11 is returned similarly to the sump 139 by the passage 154.

Further, the peripheral wall of the cylindrical valve 6 is formed with radial ports 12, 13, 14 which can be connected or disconnected with the above-mentioned ports 7, 8, 9, 10, 11, said cylindrical valve 6 being normally biased by a spring 15 towards the right hand of the valve body.

Slidably disposed within said cylindrical body 6 is a spool type pressure regulating valve 16 having a reduced diameter portion 17 in the middle thereof, said pressure regulating valve 16 being normally biased by a pressure regulating spring 18 in the same direction as the cylindrical valve 6.

The pressure regulating valve 16 is provided with, at its end opposite to the spring 18, a piston 19 having an orifice 20 formed thereon, and a load piston 21. Between the piston 19 and the load piston 21 a vibration-proof spring 22 is interposed. Thus, a space 23 is formed between said piston 19 and said load piston 21, and the space communicates through the orifice 20 of the piston 16, a passage 24 in communication with the orifice 20 and the reduced diameter portion 17 of the pressure regulating valve 16 with the radial port 13 of the cylindrical valve 6. Further, a pressure valve 2 is slidably disposed within said valve body 5 at a position spaced apart from the cylindrical valve 6, and is biased by a spring 25 towards a port 26 for a constant pressure circuit.

The pressure valve 2 is formed with orifices 27, 28. The orifice 27 serves to communicate said port 26 with a pressure chamber 29 in which a spring 25 is housed, and the orifice 28 communicates through a passage 30 with a space 31 formed between the pressure valve 2 and the cylindrical valve 6.

The pressure valve 2 is actuated in association with a solenoid valve 4 which is provided with a solenoid 32 having a valve chamber 33 and also a piston valve 35 normally biased by a spring 34 onto its valve seat, said spring being housed within the valve chamber 33. The valve chamber 33 is in communication through a small-diameter passage 36 with the pressure chamber 29, and an orifice 38 is adapted to communicate a drain port 37 with the small-diameter passage 36 and is arranged to open and shut by the above-mentioned piston valve 35.

The ratio of the diameters of the orifices 27 and 38 (orifice 27/orifice 38) is less than 1, and the piston valve 35 opens or closes the orifice 38 so that the amount of the fluid in the pressure chamber 24 is greater in the amount flowing from the orifice 38 to the drain port 37 than that supplied through the orifice 27, and accordingly it becomes the structure that a pressure drop takes place.

The hydraulic fluid supplied by a pump or the like flows through the radial port 13 formed on the circumferential surface of the cylindrical valve 6, the passage 24 formed on the pressure regulating valve 16, and the orifice 20 of the piston 16 into the space 23.

After the space 23, which is in communication with the inlet port 7, has been completely filled by hydraulic fluid, the pressure within the space will increase, and consequently the load piston 21 is urged through the cylindrical valve 6 towards the valve body 5, with its reaction force moving the pressure regulating valve 16 to the left against the biasing force of the pressure regulating spring 18.

With such leftward movement of the pressure regulating valve 16, the radial port 12 of the cylindrical valve 6 communicates with the reduced diameter portion 17 of the pressure regulating valve 16 so as to allow hydraulic fluid to pass into the drain port 10 for a low pressure circuit through the radial port 12 thereby maintaining the pressure in the inlet port 7 at a constant value.

Further, fluid which has entered the port 26 for a constant pressure circuit, flows through the orifice 28 and the passage 30 into the space 31.

As the pressure within the space 31 increases, the cylindrical valve 6 having its cylindrical head exposed to said space 31 is moved to the left.

With the leftward movement of the cylindrical valve 6, the communication between the radial port 12 of the cylindrical valve 6 and the reduced-diameter portion 17 of the pressure regulating valve 16 afforded by the pressure of hydraulic fluid which has entered the inlet port 7, is disconnected. Therefore, the fluid pressure in the closed space, which is in communication with the inlet port 7, is moved further leftwardly against the force of the pressure regulating spring 18. This results in affording again a communication between the reduced diameter portion 17 and the radial port 12 of the cylindrical valve 6, thereby to allow hydraulic fluid to pass into the drain port 10 or a torque convertor port 43 through the radial port 12. In such a manner, the pressure within the ports 10, 8, the radial ports 13, 12 and the space 31 continues to increase until the end of the cylindrical valve 6 contacts the valve body 5, and is kept at a predetermined value when the end of the cylindrical valve 6 is kept in contact with the valve body 5.

When the cylindrical valve 6 has reached the end of its stroke, allowing hydraulic fluid to pass into the torque convertor port 8, and the solenoid 32 is energized by an electric signal for changing over the speed selector valve from its neutral position to the first speed position so as to move the piston valve 35 closing the orifice 38 against the biasing force of the spring 34, and generate a voltage for an extremely short time required to drain off the hydraulic fluid within the space 31, fluid within the pressure chamber 29 flows through the small-diameter passage 36 and the orifice 38 into the drain port 37 thereby decreasing the pressure in the pressure chamber 29. However, the hydraulic pressure bearing against the end face of the timing pressure valve 2 on the side of the port 26 is kept at the supply pressure, so that the timing pressure valve 2 is subject to a leftward force and is moved to the left against the resiliency of the spring 25. Consequently, the hydraulic flowing out through the orifice 28 is blocked by the valve body 5, and hydraulic fluid within the space 31 is allowed to exit from the drain port 31a, thereby to momentarily move the cylindrical valve 6 to the right and keep it at an original modulate blow-off pressure. When the hydraulic fluid in the space 31 has been drained, the solenoid 32 is de-energized and the orifice 38 is closed by the piston valve 35. Thus, the pressure in the pressure chamber 29 is increased by fluid incoming through the orifice 29 so as to rapidly move the timing pressure valve 2 to the right with the resiliency of the spring 25. Then, fluid flow through the orifice 28 to urge the cylindrical valve 6, thereby gradually increasing the pressure of hydraulic fluid flowing in the inlet port 7. In this manner, it is possible to gradually increase the pressure of hydraulic fluid applied to a clutch brake of a selected gear train of the transmission system, thus enabling speed change to be effected smoothly.

Figure 3:
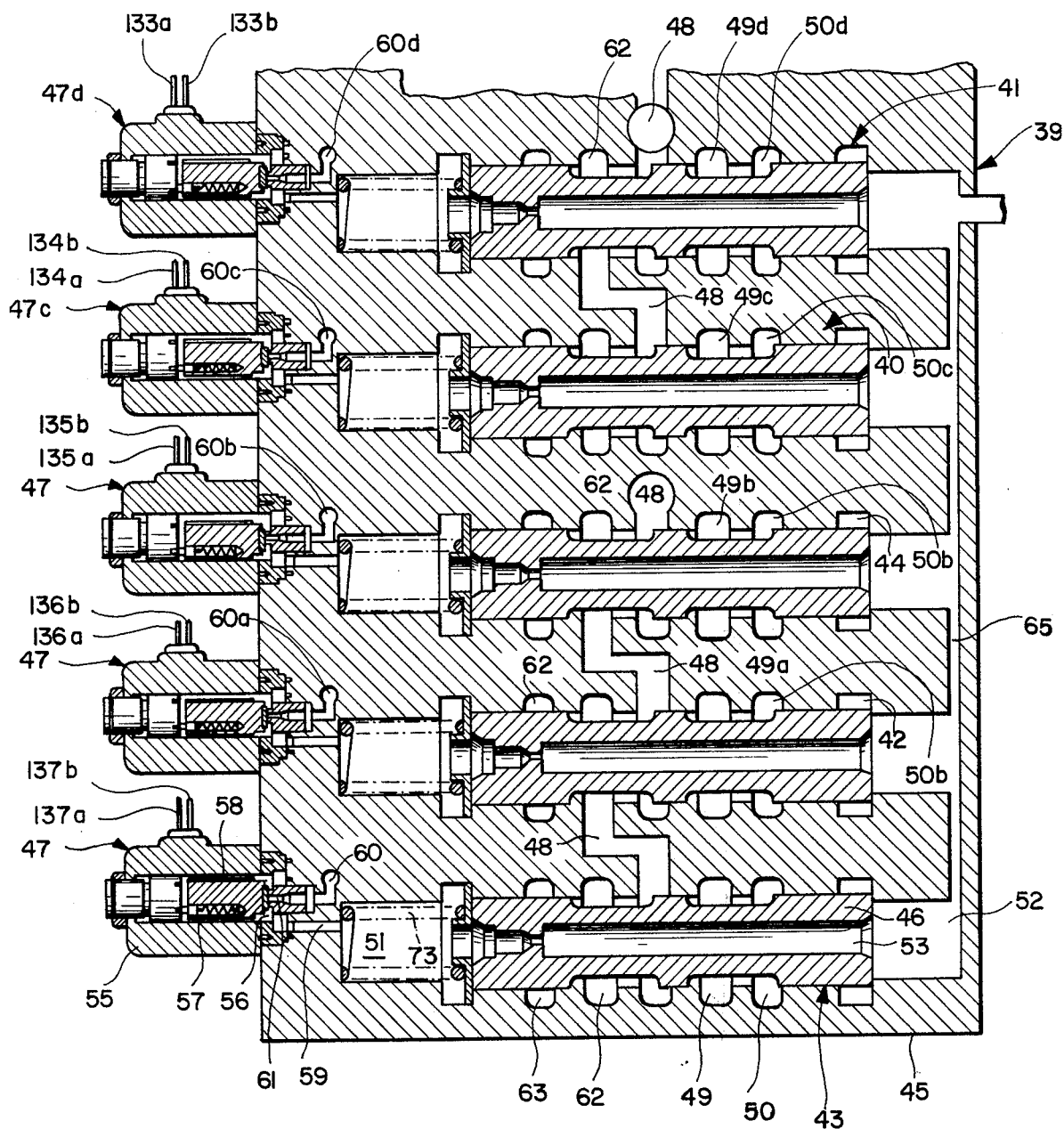
FIG. 3 is a sectional view of the hydraulic speed change control means.

The hydraulic speed change control means for controlling the pressure of hydraulic fluid to be fed to the auxiliary speed change gear on the output side of the fluid torque convertor will now be described with reference to FIG. 1 and FIG. 3.

In FIG. 1, the reference numeral 39 denotes a control valve unit of an automatic speed change gear adapted to move forward in four stages. This control valve unit is composed in combination of the shift valve 40 of the 1st clutch 68, shifted valve 41 of the 2nd clutch 69, shift valve 42 of the $F_H$ clutch 70, shift valve 43 of the $F_L$ clutch 71, and shift valve 44 of the reverse clutch 72. The first clutch 68 is communicated through the passage 168, the clutch port 49c of the valve 40, drain port 50c, and passage 155 with the sump 139. The second clutch 69 is communicated through the passage 169, the clutch port 49d of the valve 41, drain port 50d and passage 155 with the sump 139. The clutch $F_H$ 70 is communicated through the passage 170, the clutch port 49a of the valve 42, drain port 50a, and passage 155 with the sump 139. Since these valves 40 to 44 are constructed similarly, the construction of the shift valve 43 for the clutch $F_L$, one of these valves will now be described with reference to FIG. 3.

The above-mentioned valve 43 for the low speed move forward includes a valve spool 46 housed in a valve body 45 for change-over to low speed and a solenoid valve 47 for controlling the valve spool according to an electrical signal to be mentioned later.

The valve spool 46 is adapted, in association with the solenoid valve operable by an electric signal, to connect or disconnect an inlet port 48 with a clutch port 49 and also connect or disconnect the clutch port 49 with a drain port 50.

Further, pressure chambers 51, 52 are formed on both sides of the valve spool 46 within the valve body 45. The pressure chambers 51, 52 are in communication with each other through a passage 53 formed axially of the valve spool 46, and the inner peripheral wall of the passage 53 is formed with an orifice 54 on the side close to the solenoid valve 47. The abovementioned solenoid valve 47 is comprised of a solenoid 55 having a valve chamber 56 and a piston valve 58 normally urged into its valve seat by a spring 57 mounted within the chamber 56, and the piston valve 58 is adapted to open and close an orifice 61 which serves to communicate the small-diameter passage 59 with a drain port 60.

The ratio of the diameters of the orifices 54 and 61 (orifice 54/orifice 61) is less than 1, the piston valve 58 opens or closes the orifice 61 so that the amount of the fluid in the pressure chamber 51 is greater in the amount flowing from the orifice 61 to the drain port 60 than that supplied through the orifice 54, and accordingly it is constructed to take place a pressure drop.

In the valve body 45, a port 62 and a drain 63 are provided on the opposite side of the clutch port 49 and a drain port 50 relative to the inlet port 48. In each of the valves 40, 41, 42, 43 and 44 having an amount identical construction, respective pressure chambers 52 communicate with one another by way of a passage 65.

Further, the inlet port 48 of the valve 48 for the low speed move forward communicates with the port 62 of the valve 42 for the high speed move forward, the inlet port 48 of the valve 42 for the high speed move forward communicates with the port 62 of the valve 44 for the move rearward, and the inlet port 48 of the valve 44 for the move rearward communicates with the inlet port 48 of the valve 41 for the second speed. The inlet ports 48 of the valve 44 for the move rearward and the valve 41 for the second speed communicate with a pump 66 as shown in FIG. 1.

Moreover, the inlet port 62 of the valve 40 for the first speed communicates with the port 62 of the valve 41 for the second speed.

The clutch ports 49 of the valve 40, 41, 42, 43 and 44 provided in the control valve unit 39 arranged as mentioned above are connected with the clutches 68, 69, 70, 71 and 72 respectively as shown in FIG. 1.

When the solenoid 55 of the valve 42 for the low speed move forward is energized by an electric signal, the piston valve 58 moves against the biasing force of the spring 57 thereby opening the orifice 61 and causing a decrease in pressure in the pressure chamber 51. Then, the valve spool 46 is urged leftwardly by hydraulic pressure applied from the side of the pressure chamber 52 against the force of the spring 73 housed in the pressure chamber 51.

When the valve spool 46 has thus moved, the inlet port 48 is connected with the clutch port 49 so as to allow hydraulic fluid to flow through the clutch port 49 into the clutch 71 for the low speed move forward, thereby activating the latter.

When an electric signal is applied to the solenoid 55 of the valve 41 for the high speed move forward, the solenoid valve 47 and the valve spool 46 of the valve 41 operate in the same manner as in the case of the valve 42 for the low speed move forward. When the valve 42 for the low speed move forward is de-energized, the piston valve 58 is urged rightwardly by the spring 57 to close the orifice 61.

When the orifice 61 is closed, the pressure in the pressure chamber 51 increases, moving the valve spool 46 to the right with the aid of the force of the spring 73 and disconnecting the inlet port 48 from the clutch port 49 to deactivate the clutch 71 for the low speed move forward.

Regarding the return movement of the valve spool 46 by the spring 73, the operating time of the valve spool 46 can be varied depending on the amount of hydraulic fluid passing through the orifice 61.

This means that the time required for draining fluid in the clutch 71 for the low speed move forward into the drain port 50 is controlled. Therefore, if the orifice 54 of the valve spool 46 is designed to have an optimum diameter adapted to the capacity of every clutch brake cylinder, the time in which clutch is kept in neutral position can be reduced, thereby minimizing fluctuation of the torque.

Thus, according to the device of the present invention, it is possible not only to reduce the shock which frequently occurs at the time of speed change and thereby enabling the operator of the vehicle to have a comfortable ride, but also to effect a remote speed change operation.

What is claimed is:

1. A fluid pressure control device of a transmission for use in a vehicle having selector valve means, a fluid torque convertor having first and second frictional engaging means for controlling hydraulically plural hydraulically operated frictional engaging means to produce plural speed change ratios, and a planetary gear mechanism, comprising a pressure control valve provided between a source of pressurized fluid and speed selector valve said control valve having a solenoid value controlled by an electronic control circuit connected to said source and having a pressure regulator valve provided within a cylindrical valve, a timing pressure valve provided for controlling said cylindrical valve and having first and second orifices provided therein and connected to constant pressure wherein said first orifice controls said cylindrical valve and a third movable orifice engaged with the outlet of said second orifice wherein the electric signal of the solenoid valve for moving the orifice is connected to the electric signal of a solenoid for operating said speed selector valve by the operation of said electronic control circuit which includes an OR-circuit, differential circuit and monostable multivibrator so that when a speed transfer signal is produced, said movable orifice is always opened, and the control back pressure of said cylindrical valve is quickly drained by utilizing the pressure difference between the second orifice of said timing pressure valve whereby the pressurized fluid to the clutch is lowered to initial regulator pressure, and thereafter said cylindrical valve is moved by the control current flowing from the first orifice to produce modulation pressure.

2. A fluid pressure control device as set forth in claim 1 wherein said pressure control valve is coupled between a source of pressurized fluid and speed selector valve said pressure control valve comprising valve body, a valve spool inserted into said valve body wherein standard pressure is applied to one end surface thereof and a hole is formed at the other end surface thereof, a stationary orifice supplied with the standard pressure, a control chamber provided in series therewith, a spring inserted into said control chamber so that said valve spool is biased, a movable orifice provided to drain said control chamber and opened or closed by a solenoid energized by switching transistor, wherein the pressure of said control chamber is lowered by opening said movable orifice, said valve spool is moved by the difference with the standard pressure, when the movable orifice is closed, said control chamber pressure is reset to the standard pressure and said spool is returned by the force of said spring to regulate the amount flown for correcting the capacity change of the control chamber to control the moving time of said valve spool by said stationary orifice.

3. The hydraulic speed change control device of claim 1, wherein the internal peripheral wall of the cylindrical valve is formed with a plurality of radial ports adapted to be connected to an inlet port, torque converter port and drain ports, and said cylindrical valve is normally biased by a spring towards the right hand of the valve body.

4. The hydraulic speed change control device of claim 3, wherein the pressure regulating valve has a reduced diameter portion in the middle thereof and being normally biased by a spring in the same direction as the cylindrical valve.

5. The hydraulic speed change control device according to claim 4, wherein at the opposite end of the pressure regulating valve from the spring is a piston having an orifice and a load piston and a spring interposed between said piston and load piston to form a space which communicates through said orifice and a passage in said pressure regulating valve with a radial port in said cylindrical valve.

6. The hydraulic speed change control device according to claim 1, wherein the face of the pressure valve exposed to the pressure chamber is normally biased by a spring toward the port.

7. The hydraulic speed change control device according to claim 6, wherein the solenoid valve is comprised of a solenoid with a valve chamber and a piston valve normally biased by a spring onto a valve seat, the valve chamber being in communication with said pressure chamber of said pressure valve by a passage, and an orifice in said valve seat adapted as a means to communicate a drain port with said passage to said pressure chamber.

8. The hydraulic speed change control device according to claim 2, wherein the spool is mounted to connect or disconnect the clutch port with a drain port, the spool is biased by a spring in the pressure chamber at one end and the orifice communicates both end faces of the spool by means of a passage formed axially of the spool, and the solenoid valve is comprised of a valve chamber, a piston valve normally biased towards a valve seat by a spring mounted within the solenoid valve chamber, with said piston valve adapted to open and close an orifice which communicates with a drain port by a passage, said passage connecting the pressure chamber at one end of the spool with the solenoid valve chamber.

9. The hydraulic speed change control device according to claim 8, wherein in the valve body a port and a drain are provided on the opposite side of the clutch port and the drain port.

10. The hydraulic speed change control device according to claim 9, wherein the mechanism for control of the return of hydraulic fluid constitutes a series of similarly constructed valves whose pressure chambers at the end of the spool opposite the biasing spring are connected by a common passage, the clutch ports of the various valves in the series are connected with clutches, and the inlet ports are connected with ports to control the flow of hydraulic fluid.

* * * * *